United States Patent [19]
Madern

[11] 3,804,110
[45] Apr. 16, 1974

[54] MIXER TANK FOR DISPENSING POWDERY PRODUCT

[75] Inventor: Jean Pierre Madern, Cabestany, France

[73] Assignee: Tunzini Entreprise, Paris, France

[22] Filed: Apr. 6, 1972

[21] Appl. No.: 241,562

[30] Foreign Application Priority Data
Apr. 8, 1971  France .............................. 71.12583

[52] U.S. Cl. ............... 137/268, 417/41, 137/101.27
[51] Int. Cl. .............................................. B67d 5/08
[58] Field of Search ............ 137/95, 101.25, 101.27, 137/268, 99; 23/267 R, 267 E, 269; 222/57, 67, 412, 413; 417/41

[56] References Cited
UNITED STATES PATENTS

| | | | |
|---|---|---|---|
| 3,638,833 | 2/1972 | Lucas ............................. | 137/268 X |
| 1,014,048 | 1/1912 | Byers ............................. | 222/57 X |
| 2,772,834 | 12/1956 | Swenson et al. ................... | 417/41 X |
| 3,036,739 | 5/1962 | Kamysz, Jr. ........................ | 222/67 |
| 3,406,870 | 10/1968 | Arneson ........................... | 222/67 X |
| 3,411,449 | 11/1968 | Murdoch ............................ | 417/41 |
| 3,486,664 | 12/1969 | Loomans ........................... | 222/413 |

*Primary Examiner*—William R. Cline
*Attorney, Agent, or Firm*—Fitzpatrick, Cella, Harper & Scinto

[57] ABSTRACT

A hopper is mounted on a tank and has an extraction screw entering a valved opening therein for extracting a dose of powder from the hopper into the tank, and fluid enters the tank through a tap, the screw being rotated by a turbine driven by the entering fluid. The valve and tap are controlled by a float the level of which varies with the level of fluid in the tank.

3 Claims, 1 Drawing Figure

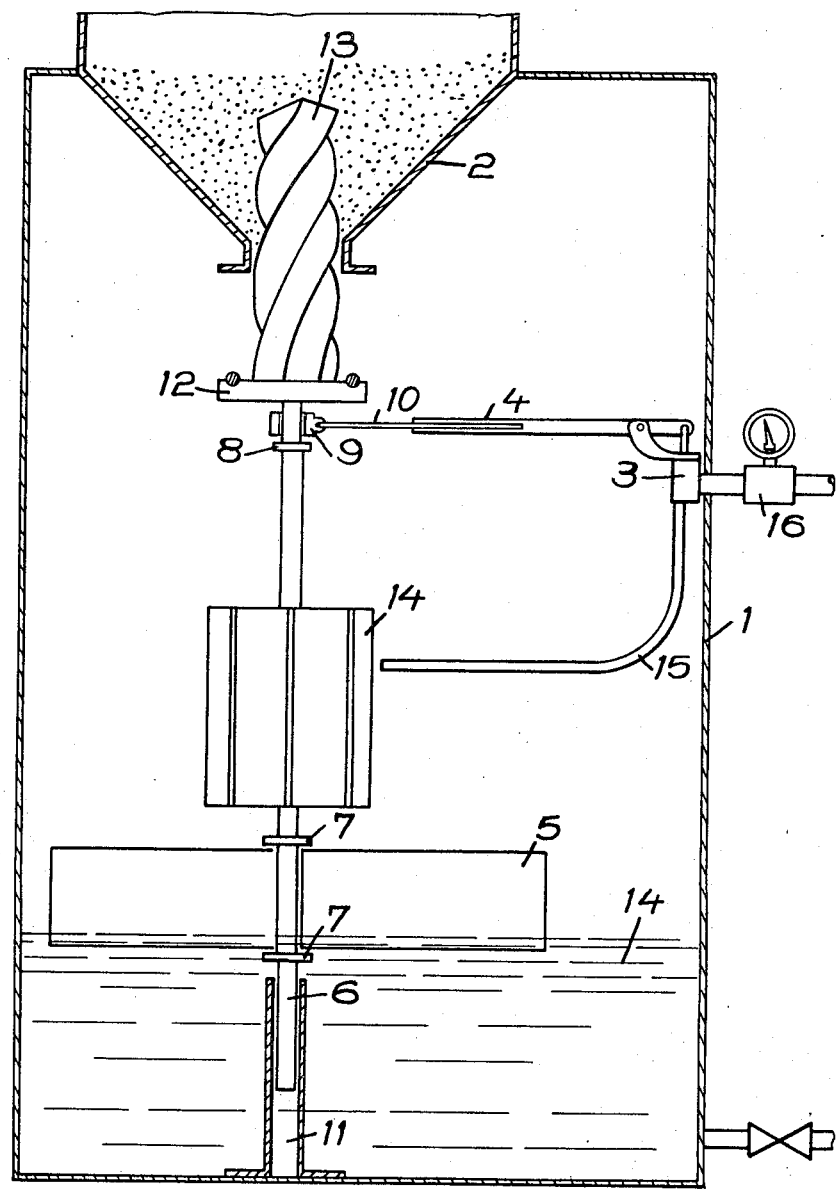

MIXER TANK FOR DISPENSING POWDERY PRODUCT

The present invention relates to a mixer tank for dispensing powdery product.

Apparatus for dispensing powdery products, especially when these products have to be mixed with water to be introduced in a circuit under pressure, are very complicated and require regular checking of the products in order to prevent the orifice of the distributing hopper from clogging.

This disadvantage exists particularly in apparatus with non-continuous flow, for which the orifice is closed by a valve which opens under the control of a float mounted in a tank into which the dose of product is poured.

The aim of the present invention is the provision of a simple dispensing device with entirely automatic functioning which operates so that there is no risk of clogging of the distributing hopper.

The invention thus has for its object a tank for automatically dispensing a dose of powder or the like, comprising a tap for supplying liquid, controlled by a float, and a hopper for supplying powdery product, wherein the hopper is closed by a valve mounted on a rod or shaft whose position depends on that of the float, this shaft, which is rotatable, supporting, above the valve, an extraction screw which penetrates inside the hopper.

The invention will be more readily understood upon reading the following description with reference to the accompanying drawing, in which:

The single FIGURE is a sectional view illustrating the inside of a dispensing tank according to the invention.

Referring now to the drawing, there is shown a tank 1 which comprises in its upper part a hopper 2 containing the product to be dispensed in successive doses, said tank being fed with water through a tap 3 whose closure is controlled by a lever 4 actuated by a float 5. This control may also be constituted by a pressostat in which case the tap 3 may be controlled electrically or electromagnetically.

The float 5 is mounted on a shaft 6 which passes freely therethrough and to which is attached two stop discs between which the float is positioned along the shaft, in the case of direct control of the water inlet tap by the float.

A third disc 8 acts on a slide 9 mounted at the end of a rod 10 which is telescopically mounted inside the lever 4 which in turn may take the form of a hollow rod.

The lower end of the shaft 6 may slide in a tube guide 11 arranged at the bottom of the tank, and to the upper end of the shaft there is fixed a closure valve 12 surmounted by an extraction screw 13 which penetrates the hopper 2 through its flow orifice.

For this screw to be able to extract the product from the hopper, it must be rotated. A turbine 14 has therefore been mounted on the shaft 6, which turbine receives the jet of filling water flowing from the tap 3 through a tube 15 suitably disposed with respect to the turbine.

It is thus seen that as the tank fills up, the float pushes the screw inside the hopper whilst the jet causes said screw to rotate during its penetration, until on the one hand the valve 12 closes the flow orifice of the hopper and on the other hand until the lever 4 causes the tap 3 to close.

The dosage, dependent on the speed of rotation of the screw, may be regulated by interposing on the inlet of water a pressure regulator 16 which enables a constant jet force to be maintained.

The invention is not limited to the single embodiment described and shown but covers on the contrary all the variants thereof, and in particular the shaft 6 may be rotated by any drive device as soon as its stopping is controlled at the same time as the closure of the feed tap.

What is claimed is:

1. Apparatus for automatically dispensing a dose of powder comprising; a tank, fluid delivery means entering said tank, a tap on said delivery means controlling the flow of fluid into said tank, a powder hopper associated with said tank and formed with an opening for discharging powder into said tank, a valve seat at said opening, valve means cooperating with said seat to open and close said hopper opening, flow control means controlling said tap and said valve means and including a float in said tank the level of which is determined by the fluid level in said tank and a rod movable with said float and connected to said valve to move same relatively to said valve seat upon movement of said float, means movable by said rod to control said tap, an extraction screw penetrating said hopper through the opening therein and movable with said rod, drive means for rotating said screw to extract a dose of powder from said hopper when said valve is open, and outlet means permitting flow of fluid from said tank.

2. Apparatus according to claim 1, characterized in that the drive means is a turbine mounted on said rod, said turbine being rotated by the flow of liquid entering said tank from said tap.

3. Apparatus according to claim 1, characterized in that the flow control means include a guide in which the lower end of said rod slides and said rod passes freely through said float, in that two stop discs are positioned on said rod one on either side of said float, and in that said means to control said tap include a lever and another stop disc on said rod to operate said lever.

* * * * *